(12) United States Patent
Perez Vazquez et al.

(10) Patent No.: US 9,814,287 B1
(45) Date of Patent: Nov. 14, 2017

(54) RETRACTABLE SUN-SHIELD WITH SOLAR POWERED USB DEVICE CHARGING STATION

(71) Applicants: Ramon Luis Perez Vazquez, Barceloneta, PR (US); Jan Benvenutti, Barceloneta, PR (US); Erick Garay Perez, Barceloneta, PR (US); Carlos Caldero, Barceloneta, PR (US)

(72) Inventors: Ramon Luis Perez Vazquez, Barceloneta, PR (US); Jan Benvenutti, Barceloneta, PR (US); Erick Garay Perez, Barceloneta, PR (US); Carlos Caldero, Barceloneta, PR (US)

(*) Notice: Subject to any disclaimer, the term of this patent is extended or adjusted under 35 U.S.C. 154(b) by 0 days.

(21) Appl. No.: 15/072,824

(22) Filed: Mar. 17, 2016

(51) Int. Cl.
| | |
|---|---|
| A45B 11/02 | (2006.01) |
| A45B 25/00 | (2006.01) |
| H02S 10/40 | (2014.01) |
| H02S 40/38 | (2014.01) |
| A45B 11/00 | (2006.01) |
| A45B 19/02 | (2006.01) |
| A45F 3/04 | (2006.01) |
| A45F 3/00 | (2006.01) |

(52) U.S. Cl.
CPC ............. *A45B 11/02* (2013.01); *A45B 11/00* (2013.01); *A45B 19/02* (2013.01); *A45B 25/00* (2013.01); *A45F 3/04* (2013.01); *H02S 10/40* (2014.12); *H02S 40/38* (2014.12); *A45B 2019/026* (2013.01); *A45B 2025/003* (2013.01); *A45F 2003/003* (2013.01)

(58) Field of Classification Search
CPC .................................................... A45B 11/02
USPC .................................... 135/16; 224/187, 576
See application file for complete search history.

(56) References Cited

U.S. PATENT DOCUMENTS

| | | | |
|---|---|---|---|
| 288,115 A | 11/1883 | Ray | |
| 578,572 A | 3/1897 | Lashells | |
| 616,903 A | 1/1899 | Crocker | |
| 3,032,046 A * | 5/1962 | Coonradt | B63B 17/02 114/361 |
| 4,170,242 A * | 10/1979 | Caso | A45B 11/02 135/146 |
| 4,179,053 A * | 12/1979 | Figura | A45F 3/08 135/120.3 |
| 6,024,264 A | 2/2000 | Java | |
| 6,076,539 A * | 6/2000 | Richardson | A45F 3/04 135/120.3 |
| 7,048,333 B2 | 5/2006 | Martinez | |
| 8,556,141 B1 * | 10/2013 | Ferraiolo | A45B 17/00 224/186 |

(Continued)

*Primary Examiner* — Noah Chandler Hawk
(74) *Attorney, Agent, or Firm* — Luis Figarella

(57) ABSTRACT

A sun/rain protector for a person inside a backpack secured to the back of a person by belts; a retractable mechanism and flexible cover, wherein said flexible cover is mounted to the frame that is mechanically coupled to the backpack. The flexible cover is made of a flexible material affixed to a portion of the circumference of the frame, so that the material blocks the sun's rays from the head and neck of the person when the frame is manually positioned to a proper protecting position. Further, above the flexible cover, the present invention has a solar powered USB mobile device charger for the user's convenience having one or more solar panels and one or more USB connecting ports.

8 Claims, 4 Drawing Sheets

(56) References Cited

U.S. PATENT DOCUMENTS

| | | | | |
|---|---|---|---|---|
| 8,727,190 B2* | 5/2014 | Blair | ............. | A45F 4/02 |
| | | | | 135/95 |
| 8,851,343 B1 | 10/2014 | Evans et al. | | |
| 8,944,300 B1 | 2/2015 | Kaufman | | |
| 9,289,039 B2* | 3/2016 | Akin | ............. | A45B 25/00 |
| 2008/0210728 A1* | 9/2008 | Bihn | ............. | A45F 3/04 |
| | | | | 224/576 |
| 2009/0058354 A1* | 3/2009 | Harrison | ............. | A45B 3/00 |
| | | | | 320/101 |
| 2012/0192905 A1 | 8/2012 | Boss | | |
| 2012/0325880 A1* | 12/2012 | Yu | ............. | A45C 15/06 |
| | | | | 224/576 |
| 2013/0092715 A1* | 4/2013 | Tayebi | ............. | A45B 11/02 |
| | | | | 224/576 |
| 2013/0098410 A1 | 4/2013 | Prasannakumar et al. | | |
| 2014/0061273 A1* | 3/2014 | Bullivant | ............. | A45F 3/04 |
| | | | | 224/576 |
| 2015/0230569 A1* | 8/2015 | Williams | ............. | A45B 25/16 |
| | | | | 135/90 |
| 2015/0296938 A1* | 10/2015 | Armina del Valle | .. | A45B 11/02 |
| | | | | 135/161 |

\* cited by examiner

RETRACTABLE SUN-SHIELD WITH SOLAR POWERED USB DEVICE CHARGING STATION

PATENTS CITED

The following documents and references are incorporated by reference in their entirety, Biven (U.S. Pat. No. 4,112,957), Garrido et al (U.S. Pat. No. 4,657,037), Boss (U.S. Pat. Appl. No. 201220192905), Prasannakumar et al (U.S. Pat. Appl. No. 20130098410), Tayebi (U.S. Pat. No. 8,733,378) and Kaufman (U.S. Pat. No. 8,944,300).

FIELD OF THE INVENTION

The present invention relates generally to sun protective devices, and more specifically, it relates to a retractable sun protector for a person with a utility solar powered USB device charging station.

DESCRIPTION OF THE RELATED ART

It is generally well known among those who work outdoors, or who are exposed for a long period of time at an open space that there are several natural or environmental enemies. The sun is one of said enemies, which when unshielded, beats down upon the head, face, ears and neck, causing sunburn.

Numerous sun-shade devices have been provided in prior art that are adapted to protect user's head, face and neck from the sunlight. For example, a well know device is the brimmed hat. However, the use of a brimmed hat has for that purpose is ineffective, because it prevents the flow of air between the head and the hat, resulting in the accumulation of heat.

Other devices, such as U.S. Pat. No. 4,112,957 and U.S. Pat. No. 4,657,037, disclose complexes and not easy retractable sun shields. Therefore, there is a need to provide an easy retractable protective device for sun exposure in order to avoid sun's damage to the worker that has the capability to provide an immediate free of cost power solution for the user, by installing a solar panel and USB connecting port above the overhead canopy, to charge mobile devices during outdoor activity.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a stowable sun-shield protective device comprising: a multiple use backpack having a cavity, said cavity housing an extendable frame assembly having an expandable/folding sun-shield assembly at said frame assembly distal end; wherein said extendable frame assembly is comprised of two or more extendable frames, said extendable frames being comprised of a bottom frame connected to the inside of said cavity housing, and an upper frame located at the distal end of said extendable frames, plus a top frame connected to the distal end of said upper frame and equipped with rotational means; wherein said stowable sun-shield assembly is comprised of an expandable/foldable canopy attached to said top frame.

In another aspect, said extendable frame assembly is comprised of two frames, a bottom frame that hosts an upper frame within, and a frame release mechanisms allowing for the extending and locking in an open position, or collapsing and locking in a locked position of said upper frame from said bottom frame; said distal portion of said upper frame has a handle spanning said distal end, and said rotational means connecting said distal end of said upper frame to said top frame are comprised of one or more rotating joints with limits of travel, so that top frame is held in a position that is parallel to said upper frame at one end of said joints travel, and another position that is roughly perpendicular to said upper frame; said stowable sun-shield being comprised of a foldable canopy being securely attached to the periphery of said top frame at one or more points. In yet another aspect, said foldable canopy includes one or more span extension, each said span extension formed by a folding extrusions having hinging interfaces located along the periphery of said top frame and covered by a piece of canopy, so that said extrusions hangs and extends significantly parallel to the plane of the top frame when said top frame is roughly perpendicular to said upper frame, and fold within the area of said top frame when said top frame is significantly parallel to said upper frame.

In another aspect, said foldable canopy includes a foldable neck-shield extension. In yet another aspect, said frame release mechanism is comprised of at least one bottom frame locking pin assembly located at/near the bottom of said bottom frame and designed to securely lock the near end of said upper frame when the assembly is closed and hosted within said cavity; and at least one opening/closing locking pin assembly located on said upper frame, said assembly being comprised of a release button located at said upper frame distal end, a connecting rod connection said distal end lever to a locking pin assembly located at said upper frame near, so that activation of said button allows the release of said locking pin. In yet another aspect, the area of said top frame intended to be facing the sky when said top frame is at the position that is roughly perpendicular to said upper frame has one or more solar cells, said solar cells being electrically connected to an outlet. In another aspect, said one or more solar cells are electrically connected to said backpack. In yet another aspect, said one or more solar cells are connected to one or more USB outlets and/or one or more batteries within said backpack.

Other features and advantages of the present invention will become apparent upon examining the following detailed description of an embodiment thereof, taken in conjunction with the attached drawings.

Figure 1:
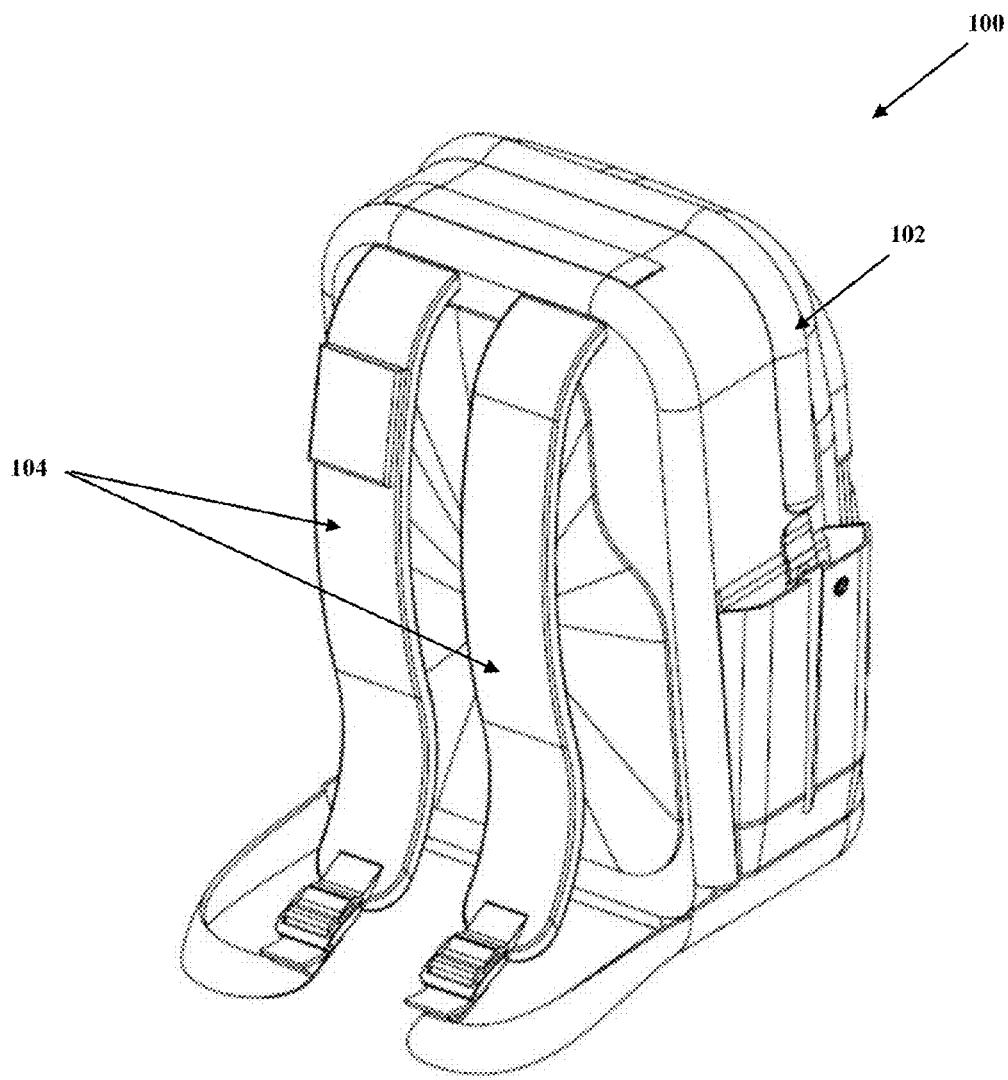
FIG. 1 shows the stored position of the sun-shield device, according to an exemplary embodiment of the present invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 2:
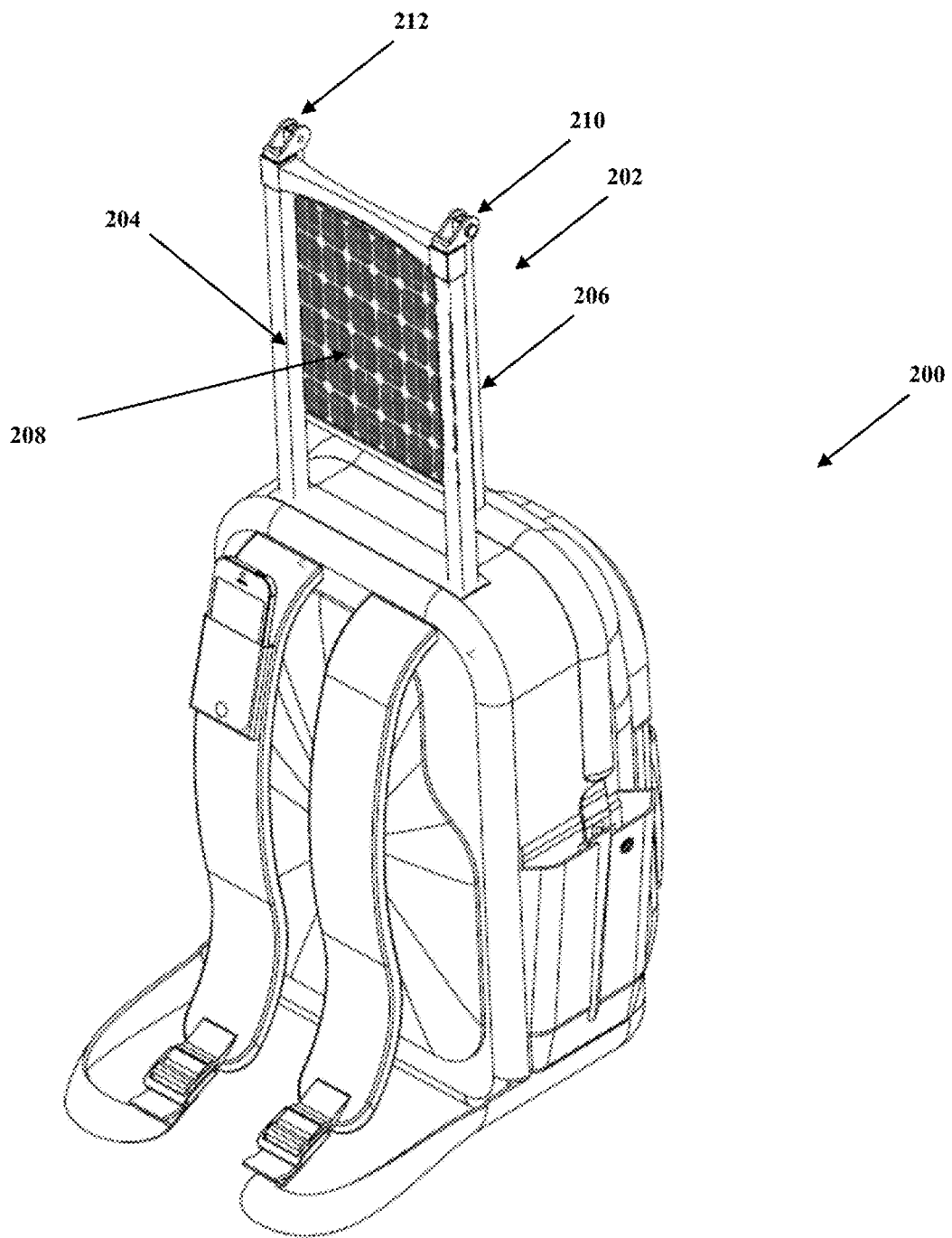
FIG. 2 shows the first position during the deployment of the sun-shield device, according to an exemplary embodiment of the present invention.
Figure 3:
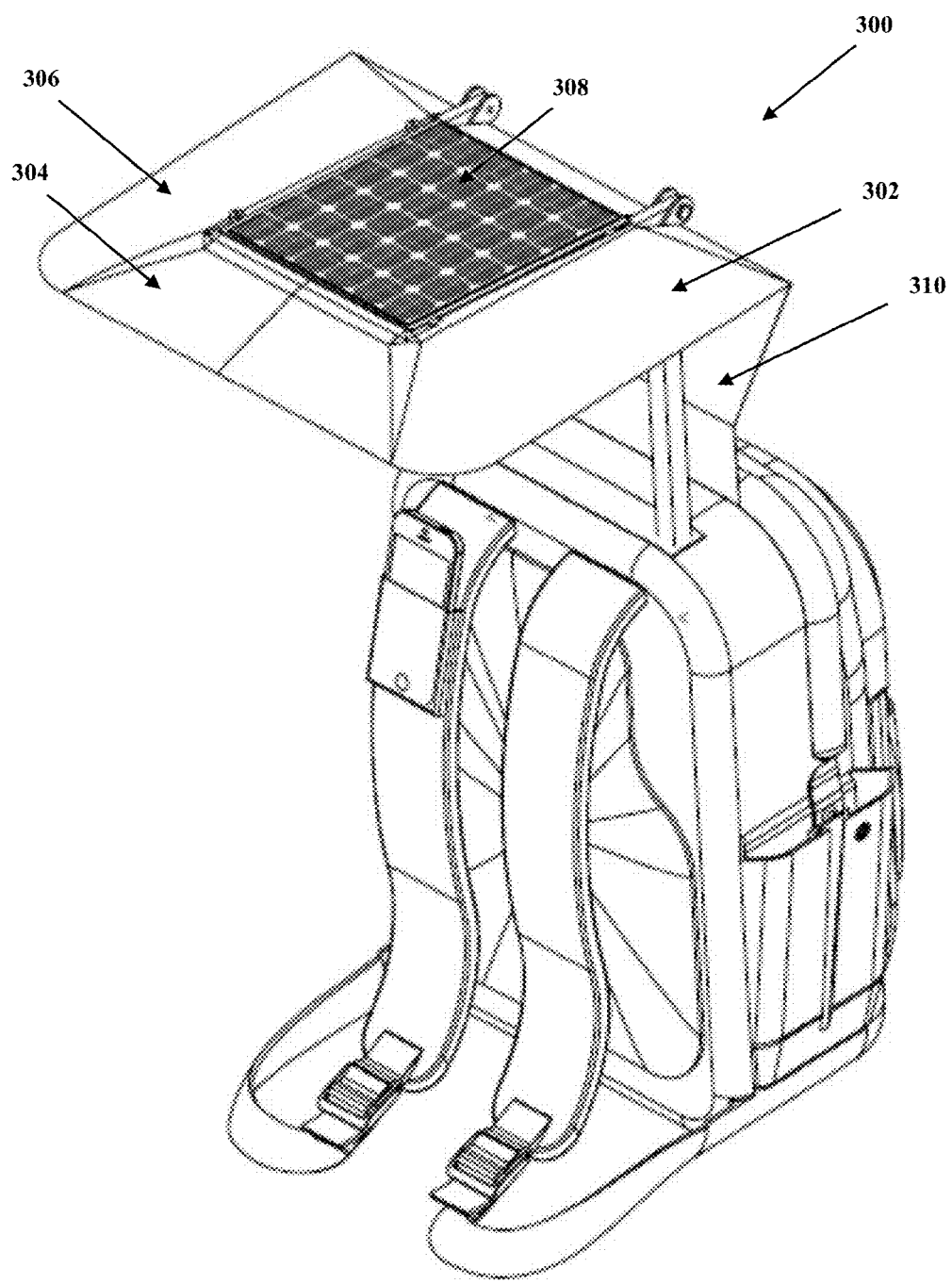
FIG. 3 shows a deployed view of the sun-shield device, according to an exemplary embodiment of the present invention.

Referring to FIGS. 1-3 we see an illustrative embodiment 100 of the invention, a backpack 102 having cross belts 104 adapted to extend over shoulders and/or across body of the person, wherein said cross belt comprises attaching means, such as clips (not shown) to secure the backpack to the back of the person.

In one embodiment, the backpack 102 has a cavity 428 within which is housed an extendable frame assembly 204 that is attached to the inside of said cavity 428. When extended 200, said frame assembly carries at its distal end 202 a top frame top 206 housing a canopy 208 which may have one or more deployable span extensions 302, a neck-shield extension 304 and one ore more solar panels 306 which may be electrically connected to one or more USB or other suitable outlets within said device.

Figure 4:
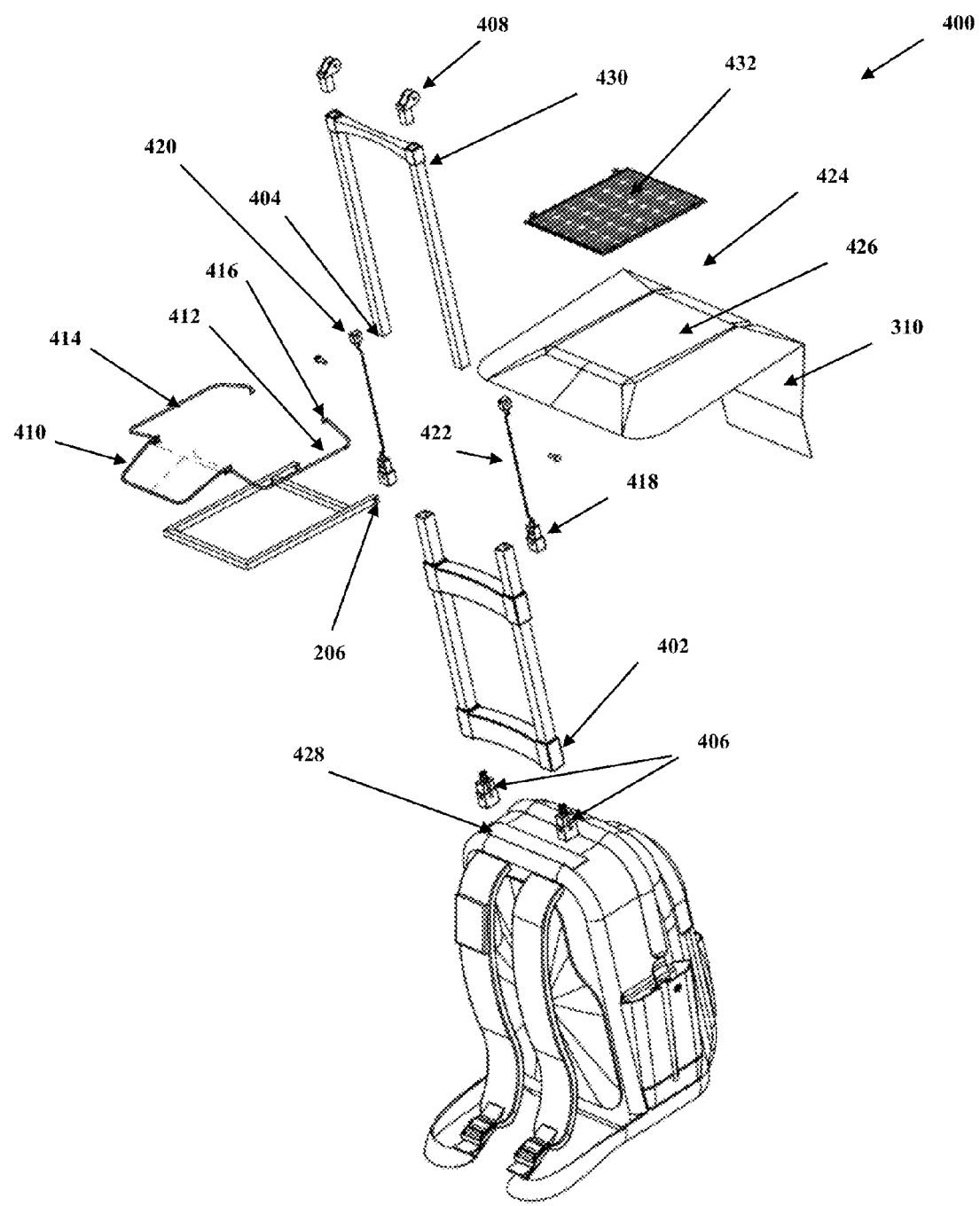
FIG. 4 shows the various components of the sun-shield device, according to an exemplary embodiment of the present invention.

Referring to FIG. 4, we see the other components of the backpack 102. The extendable frame assembly 204 is mechanically connected to the inside of the backpack cavity, and in one embodiment is comprised of two or more frames 402, 404, comprised of a bottom frame 402 and an upper frame 404, plus none to an infinite number of intermediate frames between said bottom 402 and upper 404 frames. The lowest portion of the bottom frame 402 (also defined as the near end of said bottom frame 402) is configured to be attached to the inside of the cavity within said backpack 102. In one embodiment this may be accomplished with fabric fasteners. In an alternate embodiment, they may be attached with one or more bottom frame locking pins 406.

Deploying the sun-shield is normally accomplished by pulling the extended frame assembly 204 from the cavity within the backpack 102 to its full extended position 300, then 'flipping' the top frame 206 (attached to the distal end 202 of the upper frame 404 from the storage position 200 where the top frame 206 is parallel, significantly or almost parallel to the top frame 206, for storage within the cavity when the upper frame 404 is pushed into the bottom frame 402. The one or more rotational flipping means 210, 212 securing the top frame 206 to the upper frame 404 are located at the distal end 202 of said upper frame 402.

In one embodiment, said rotational means are comprised of one or more rotating joints 408. Said joints may have two positions, the stowed position (see in FIG. 2, where said top frame 206 is significantly parallel to said upper frame 404), and the deployed or open position (FIG. 3), where the top frame is set at an angle. Said angle may be one significantly orthogonal to said top frame 404, or adjustable by said user as desired. In another embodiment, the rotating joints 408 are adjustable to two or more open position angles.

The one or more foldable canopy extensions (302, 304, 306) are canopy material spanning the one or more folding span extensions (410, 412, 414). These span extensions have a loop or hook end 416, so that when placed into openings along the perimeter of the top frame 206 said span extensions are designed so that when the shade is open or deployed (FIG. 3), they rest at an angle that is parallel or slightly drooping to form an angled awning to the top frame 206 to the angle of the top frame.

When the shield is stowed (FIG. 2), they spans/canopy extensions rotate so that they fold into the area of the top frame 404 for storage within the cavity in the backpack. Similarly, the neck-shield extension 310, is located along the back of the extendable frame assembly, so that when extended and deployed, it provides protection of the rear of the neck, and when the unit is stowed, it goes into the cavity.

The upper frame 404 extends from the bottom frame (and any other intermediate frame members part of the extendable frame assembly) and remains in the extended position through the locking pin 418 located at said upper frame near end, engagement with the top of the bottom frame 402. To unlock it and store it, the one or more release buttons located at the distal end of said upper member 404 are pushed (via user digit activation and/or through the folding of said top frame 206 into the stowed position FIG. 2, which actives one or more connecting rods 422, which releases the locking pin 418, allowing the upper frame to go into the bottom frame (or other intermediates frame elements, all collapsing into the backpack cavity.

In one embodiment, the backpack 102, foldable canopy 424 (made of the top frame cover 426 as well as the one or more deployable foldable canopies (302, 304, 306) and neck-shield 310) could be made of a single or a variety of materials, sizes, styles and/or colors. Preferred materials are lightweight materials, such as, but not limited to nylon, Dacron, cotton, polyester, carbon fiber, Kevlar, and is configured to have an ergonomic shape or materials that provide a cushioned, comforting and gentle contact with the user's back and shoulders. Similarly, the extendable frame (including the bottom 402, upper 404, top 206 frames (as well as any other intermediate frame and other structures) could be made of similar or different materials. Preferred materials are strong lightweight materials, such as aluminum, carbon fiber, fiberglass and Kevlar, among others.

In another embodiment, the stowable shield 300 comprises an interchangeable flexible cover (canopy) comprising an upper cover and lower cover. The upper cover and lower cover may be integrally made or separated. Mainly, the upper cover 426 stretches over the top frame 206 and/or the lower cover covers (comprised of the foldable canopies (302, 304, 306) placed on the retractable mechanism. One or more affixing means are used to attach the cover 426, to the top frame 206, such as fabric fasteners, magnets, zippers and more. The fabric may include different materials. However, preferred materials are UV-resistant, water-repellent as the flexible cover. Further, the fabric may include indicia for promotional purposes.

In one embodiment, the left and right folding canopies (302, 306) of the sun shield comprise lateral covers to protect user's face from the sun and other elements, as well as to shield direct sun exposure. Such lateral shields are attached to the top and back covers by means of zippers, fabric fasteners or buttons. Preferred material for such lateral shields is see through mesh to allow visibility and ventilation, while providing the intended protection.

The top part of the canopy comprises a top frame 206, lateral and front spans (410, 412, 414); wherein said spans (410, 412, 414) are configured to be fixed or adjustable as to cover a user's head, neck and shoulders. For example, the frame dimensions are wide and long enough to avoid or reduce user's exposure to sunlight, rain, snow among other elements. In the instant case, and as part of the exemplary embodiment, the top frame 206 comprises a square shape, but any other suitable shape may be used, as long as it fits within the backpack cavity. For example, the top frame 206 may double fold, making it a longer piece extending in front of the wearer.

In one embodiment, the upper frame 404 slides upward through the inside of the bottom frame 402 extending outside the backpack cavity, performing the deployment action and bringing with it the folded top rack 206 and canopy/solar panel. The extraction may happen via pulling on the handle 430 and or on the near side of the top frame 206 where it meets the distal end of the upper frame 404. Storing is accomplished by pushing the upper frame into the bottom frame (as shown above), and then pressing quick pin assemblies 406 and actuating the plastic triggers.

In one embodiment, the displacement between said upper frame 404 and said bottom frame is completed (reaching a recessed position) by vertically sliding upward the upper frame 404, where a quick pin assembly 418 locks the extension frame upper frame 404 at the recess position within the top or distal end of the bottom frame 402.

In one embodiment the flexible cover 424 and top frame 206 when deployed are positioned above a user's head to provide the desired sun protection. Such may be accomplished by rotating the top frame 206 around the rotating joint or hinge mechanism 420 in such a way that the top frame 206 and canopy 426 are substantially parallel to the ground or ground datum when a person wearing the backpack stands.

In one embodiment, a solar cell 432 is mounted atop the top frame 236 and any other obstruction, so that it may be exposed to the sky (FIG. 3) when the shield is deployed. The energy generated by said cell 432 is then routed via a cable down the extended frame assembly for directly charging a cellphone/tablet/PC/iPAD etc. 434 and/or into the backpack for charging a battery. In either case, the solar cell 432 may be connected to a USB/Lightning or other similar DC charger, or to an inverter to generate AC voltages. The cable coming down may be straight or coiled, to compensate for the extension of the top frame 206 away from said backpack.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A stowable sun-shield protective device comprising:
    a multiple use backpack having a cavity, said cavity completely housing within it an extendable frame assembly having an expandable/folding sun-shield assembly at a distal end of said extendable frame assembly;

wherein said extendable frame assembly is comprised of two or more extendable frames, said extendable frames being comprised of a bottom frame connected to the inside of said cavity housing, and an upper frame located at the distal end of said extendable frames, plus a top frame connected to the distal end of said upper frame through rotational components allowing said top frame to be in either a stowed or an deployed position;

wherein said stowable sun-shield assembly is comprised of an expandable/foldable canopy attached to said top frame, wherein said canopy creases to a width equal or smaller to that of said extendable frame and expands to a width wider than said extendable frame fold.

2. The device of claim 1 wherein;

said extendable frame assembly is comprised of two frames, a bottom frame that hosts an upper frame within, and a frame release mechanisms allowing for the extending and locking in an open position, or collapsing and locking in a locked position of said upper frame from said bottom frame;

said distal portion of said upper frame has a handle spanning said distal end, and said rotational components connecting said distal end of said upper frame to said top frame are comprised of one or more rotating joints, one or more of said joints having built-in limits of travel, so that said top frame may be held solely by said one or more rotating joints in at least a first position that is parallel to said upper frame at one end of said rotating joints travel, and at least a second position that is roughly perpendicular to said upper frame;

said stowable sun-shield being comprised of a foldable canopy being securely attached to the periphery of said top frame at one or more points.

3. The device of claim 2 wherein;

said foldable canopy includes one or more span extension, each said span extension formed by a folding extrusion having a loop or hook hinging interface along the periphery of said top frame and covered by a piece of canopy, so that when said foldable canopy is opened or deployed, each said span extension remains open at an angle determined by the limit of the stretching of said canopy so said span extension hangs and extends significantly parallel to the plane of said top frame, and wherein said span extension folds within the area of said top frame when said top frame is significantly parallel to said upper frame.

4. The device of claim 3 wherein;

said foldable canopy includes a foldable neck-shield extension.

5. The device of claim 4 wherein;

said frame release mechanism is comprised of at least one bottom frame locking pin assembly located at/near the bottom of said bottom frame and designed to securely lock the near end of said upper frame when the assembly is closed and hosted within said cavity; and at least one opening/closing locking pin assembly located on said upper frame, said assembly being comprised of a release button located at said upper frame distal end, a connecting rod connecting a distal end lever to a locking pin assembly located at said upper frame, so that activation of said button allows the release of said locking pin assembly.

6. The device of claim 5 wherein;

the area of said top frame intended to be facing the sky when said top frame is at the position that is roughly perpendicular to said upper frame has one or more solar cells, said solar cells being electrically connected to an outlet.

7. The device of claim 6 wherein;

said one or more solar cells are electrically connected to said backpack.

8. The device of claim 7 wherein;

said one or more solar cells are connected to one or more USB outlets and/or one or more batteries within said backpack.

* * * * *